United States Patent [19]
Spilman et al.

[11] Patent Number: 5,907,027
[45] Date of Patent: May 25, 1999

[54] REDUCING IONIC IMPURITIES CONTENT IN AROMATIC POLYCARBONATE RESINS

[75] Inventors: Gary E. Spilman; Eric T. Gohr; David A. Bradley, all of Evansville, Ind.

[73] Assignee: General Electric Company, Pittsfield, Mass.

[21] Appl. No.: 09/082,106

[22] Filed: May 20, 1998

Related U.S. Application Data

[63] Continuation-in-part of application No. 08/832,722, Apr. 11, 1997.

[51] Int. Cl.[6] .................................................... C08G 64/00
[52] U.S. Cl. ........................... 528/196; 525/461; 528/198
[58] Field of Search ..................................... 528/196, 198; 525/461

[56] References Cited

U.S. PATENT DOCUMENTS

| | | | |
|---|---|---|---|
| 3,673,146 | 6/1972 | Factor | 528/196 |
| 4,358,568 | 11/1982 | Fox et al. | 525/439 |
| 4,381,358 | 4/1983 | Rosenquist | 524/114 |
| 5,773,493 | 6/1998 | Bhatia et al. | 523/328 |

*Primary Examiner*—Terressa Mosley

[57] ABSTRACT

An aromatic polycarbonate composition having less than 400 parts per billion each of ionic impurities, particularly sulfate, chloride and fluoride ions prepared by devolatilizing the ionic impurities from a polycarbonate composition employing an aqueous medium of about 1% by weight based on the weight of the polycarbonate composition. Preferably the devolatilizing is carried out in an extruder during compounding the polycarbonate composition and preferably under a vacuum. Also, the extruded strands of polycarbonate resin are quenched in a deionized water bath.

16 Claims, No Drawings

REDUCING IONIC IMPURITIES CONTENT IN AROMATIC POLYCARBONATE RESINS

This application is a Continuation-in-Part of Application Ser. No. 08/832,722, filed Apr. 11, 1997.

FIELD OF THE INVENTION

The present invention is directed to a thermoplastic aromatic polycarbonate composition which has reduced ionic impurities, and maintains good processibility properties. The product is a higher quality polycarbonate resin for producing higher quality molded articles such as computer hard drive platter carriers or pre-chip silicon wafer carriers for the computer industry. More specifically, this invention is directed to an improved process and to an improved product from such process as herein described.

BACKGROUND OF THE INVENTION

Polycarbonate resin may often contain certain impurities which in turn affect their property performance in the final molded article. For example, sulfate, chloride and fluoride ions, if present in sufficient quantities, will adversely affect color and processability of polycarbonate resins for producing pre-chip silicon wafer carriers, or computer hard drive platter carriers. Specifically, the sulfate ions can react with residual ammonia on the surface of the silicon wafer to form ammonium sulfate which forms a white residue on the surface of a silicon pre-chip wafer. The wafer then requires cleaning before being processed into a computer chip. Additional heat phase exposure such as injection molding, extrusion or compounding thereof, may also induce discoloration of the polycarbonate resin. Even with phosphite stabilizers, yellowing of the polycarbonate and hydrolysis of the phosphite can occur, particularly at high processing temperatures. It is believed that the phosphite stabilizers, which are susceptible to hydrolysis at elevated processing temperatures, form in-situ acid species which can then react with the polycarbonate. Such reactions could possibly increase chain scission and give rise to side-reactions which can eventually generate color in the molded article. This undesirable coloration can also occur during extrusion, compounding or molding of the polycarbonate resin. Moreover, polycarbonate/PTFE resin parts in hard drives may contain quantities of fluoride ions that may cause corrosion of the hard drive platter.

In order to achieve certain desired or improved properties, additives may be introduced into polycarbonate resin compositions during extrusion, compounding or injection molding. For example, small amounts of polytetrafluoroethylene (PTFE) may be added to achieve a polycarbonate/PTFE blend having a lower coefficient of friction than polycarbonate alone.

Additionally, it is known to stabilize polycarbonate resin against discoloration by adding phosphites and/or epoxies which act as stabilizers. The stabilizers are thought to neutralize impurities which would otherwise cause coloration of the polycarbonate compositions. Such additives are broadly disclosed in such U.S. Pat. Nos. as 4,381,358, 4,358,563 and 3,673,146. Unfortunately, these stabilizers may adversely affect processability.

Accordingly, if certain known impurities could be removed from polycarbonate compositions without using such additives to neutralize the impurities, the resultant composition would avoid both the processability problems caused by additives and problems caused by impurities (e.g., coloration).

Therefore, it is an object of this invention to provide a process for reducing ionic impurities in a polycarbonate resin.

Another object of this invention is to reduce ionic impurities in a polycarbonate resin during melt blending of the polycarbonate composition.

Yet another object of the invention is to reduce sulfate, chloride and fluoride ions in a polycarbonate resin.

Still another object of this invention is to produce a polycarbonate resin having reduced ionic impurities.

SUMMARY OF THE INVENTION

This invention is directed to a polycarbonate composition having reduced ionic impurities, and to a process for producing a polycarbonate composition having reduced ionic impurities. This invention is also directed to a aromatic polycarbonate composition having reduced ionic impurities. This invention is further directed to a polycarbonate/ PTFE composition having reduced levels of free fluoride ion. The polycarbonate composition may be either injection molded, extruded into sheet or film, profile extruded, co-extruded or extruded blow molded.

The process of this invention comprises devolatilizing impurities downstream in a melt blending processing apparatus, such as an extruder, during compounding of the aromatic polycarbonate resin formulation. An aqueous medium is used to devolatilize the impurities. A small amount of the aqueous medium, preferably water, may be added to the formulation during melt blending in an extruder. The ionic impurities may then be removed by devolatilization, generally, under a vacuum downstream in an extruder. While removal of the sulfate ions is the preferred ion removal, it has been found that other ions are also removed such as chloride or fluoride ions. The sulfate, chloride and fluoride ions are preferably each removed down to less that 400 parts per billion (hereinafter ppb). In polycarbonate/PTFE blends comprising up to 10% PTFE, the fluoride ions are also removed down to less than 400 ppb.

In a preferred melt blending process according to the invention, the formulation is extruded through a die into strands which are then pelletized. The strands, before pelletizing are passed through an aqueous medium cooling or quenching bath. Since water has a fairly high ionic concentration, namely sulfate, chloride and fluoride ions, the polycarbonate resin strands become re-contaminated with these ions. Therefore, the process of this invention further requires using an aqueous cooling bath through which the extruded strands are passed having a low ion concentration, particularly a low sulfate, chloride and fluoride ion content. Therefore, the water bath should be analyzed at least for sulfate and chloride ion concentrations, to make certain they are less than about 400 ppb. Alternatively, deionized water should be used.

The process of compounding or melt blending the aromatic polycarbonate resin described herein is well known to those skilled in the art of compounding or melt blending an aromatic polycarbonate formulation, and is disclosed in numerous articles and patents for preparing polycarbonate molding formulations. Preferably, the composition is first compounded or melt blended with additive materials, generally, in an extruder. The compounded formulation is then extruded into strands which are typically quenched in an aqueous bath, pelletized, dried and processed under heat and pressure to form the finished article. The finished article may be injection molded, profile extruded, sheet or film extruded, co-extruded or extruded blow molded into hollow shapes such as single or multi-layer plastic objects such as bottles, computer hard drive platter carriers, parts for hard drives, or silicon pre-chip wafer carriers for the computer industry.

In the process described herein, a small amount of an aqueous medium is added to the compounding formulation to enhance the removal of the ionic impurities. Also, an aqueous quenching bath having a low ion concentration is employed to further reduce ionic impurities. The amount of this aqueous medium, which is preferably water, is sufficient to reduce ionic impurities, (e.g., sulfate, chloride and fluoride ions) to less than about 300 ppb each. The amount of aqueous medium added is typically about 0.25 to about 2.0 weight % based on the weight of the polycarbonate formulation, and preferably is about 0.75 to about 1.5 weight %. About 1.0% has been found to be optimum.

The cooling or quenching aqueous bath should also have a low ion concentration. Specifically, the sulfate, chloride and fluoride ion concentrations should preferably each be less than about 300 ppb, and more preferably, should be less than about 110 ppb. In a most preferred version of the invention, the ionic concentrations of sulfate, chloride and fluoride are each less than about 50 ppb.

The aqueous medium may be added with the ingredients in the feed hopper of the extruder, or may be added downstream to the melt. Obviously, the aqueous medium should be added prior to devolatilization of the aqueous medium and removal of ionic impurities. The aqueous medium may be added as one shot or may be added in several increments. For example, part of the aqueous medium may be added in the feed hopper, and the balance may be added downstream in the extruder. Alternatively, the aqueous medium may be added in increments down from the feed hopper.

The process of this invention may also be employed to reduce the levels of free fluoride ion in polycarbonate/PTFE blends. Specifically, in an alternate embodiment of the invention, a formulation of polycarbonate/PTFE is formed by coextruding a mixture of 0–10% PTFE and 100–90% polycarbonate at temperatures between 400° F. and 600° F. The extrusion is performed as described above. The PTFE may be a source of free fluoride ion in the final product. However, the free fluoride ion introduced through the PTFE may be removed by treating the polycarbonate/PTFE blend using the process according to the invention. Specifically, a small amount of aqueous medium is added during melt blending, and is devolatilized downstream, and a purified quenching bath is employed.

The aromatic polycarbonate resin employed herein may be any of the known aromatic polycarbonates or co-polymers or terpolymers thereof, or blends of polycarbonates with other polymers, co-polymers or terpolymers thereof. The aromatic polycarbonate employed in the practice of this invention may be prepared by reacting a dihydric phenol with a carbonate precursor in the presence of an acid acceptor and generally a molecular weight regulator. Any dihydric phenol may be employed in preparing the polycarbonate resin disclosed herein. Preferably, they are mononuclear or polynuclear aromatic compounds containing as functional groups two hydroxyl radicals, each of which is attached directly to a carbon atom of an aromatic nucleus. Examples of some of the dihydric phenols which can be employed in the practice of this invention are bisphenols such as 1,1-bis(4-hydroxyphenyl) methane, 2,2-bis(4-hydroxyphenyl) propane, 4,4-bis(4-hydroxyphenyl) heptane, etc.; dihydric phenol ethers such as bis(4-hydroxyphenyl ether, bis(3,5-dichloro-4-hydroxyphenyl) ether, etc.; dihydroxy diphenyls such as p,p'-dihydroxydiphenyl, 3,3'-dichloro -4,4'-dihydroxy-diphenyl, etc.; dihydroxyaryl sulfones such as bis(4-hydroxyphenyl) sulfone, bis(3,5-dimethyl-4-hydroxyphenyl) sulfone, bis (3-methyl-5-ethyl-4-hydroxyphenyl) sulfone, etc.; dihydroxy benzenes, resorcinol, hydroquinone; halo- and alkyl-substituted dihydroxy benzenes such as 1,4-dihydroxy-2-chlorobenzene, 1,4-dihydroxy-2,3-dichlorobenzene, 1,4-dihydroxy-2-methylbenzene, etc.; and dihydroxy diphenyl sulfoxides such as bis(4-hydroxyphenyl) sulfoxide, bis(3,5-dibromo-4-hydroxyphenyl) sulfoxide, etc.

The carbonate precursor employed in the practice of this invention can be either carbonyl halide or a haloformate. The carbonyl halides which can be employed herein are carbonyl bromide, carbonyl chloride, carbonylfluoride, etc.; or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc). While other carbonate precursors will occur to those skilled in the art, carbonyl chloride, also known as phosgene, is preferred.

The reaction disclosed above is preferably known as an interfacial process or reaction between the dihydric compound and a carbonyl chloride such as phosgene. Another process for preparing the aromatic polycarbonate of this invention is the transesterification process which involves the transesterification of an aromatic dihydroxy compound and a diester carbonate. This process is known as the interfacial melt process. In the practice of this invention, the process of producing the aromatic polycarbonate is not critical. The critical feature of this invention is preparing the aromatic polycarbonate resin formulation by devolatilization of the aqueous medium containing the ionic impurities as described above. As used herein, aromatic polycarbonate shall mean and include any of the aromatic polycarbonates and combinations thereof as set forth previously.

The polycarbonate composition of the invention may also include such additives as UV stabilizers, thermal stabilizers, release agents, fillers and reinforcing fillers such as glass fibers (short or long glass fibers), carbon fibers, talc, silica and other known additives employed in polycarbonate compositions. Alternatively, the polycarbonate composition may be a co-extruded blend of polycarbonate and PTFE.

DETAILED DESCRIPTION OF THE EXAMPLES OF THIS INVENTION

This invention can be further described by means of the following Examples. It should be understood, however, that this invention shall in no way be restricted by these Examples. In the Examples where amounts are in terms of percentages, they are percent by weight.

EXAMPLE 1

Four samples of about 1000 grams each of a polycarbonate resin were prepared as follows:

Sample A was an aromatic polycarbonate powder having an intrinsic viscosity of about 0.50 deciliters per gram (dl/g) as measured at 20° C. in methylene chloride. The polycarbonate powder was not melt extruded in an extruder.

Sample B was prepared using the polycarbonate powder of Sample A by melt blending in an extruder a formulation of the polycarbonate powder of Sample A and standard additives of mold release, thermal stabilizers and colorants. This sample was melt blended in a vented extruder at about 330° C. and at an extrusion pressure of about 1200 psi. The extruded strands of Sample B were quenched in a water bath employing regular city water. Sample C was also an aromatic polycarbonate powder but had an intrinsic viscosity of about 0.45 dl/g as determined under the conditions as employed with Sample A. The Sample C was also not melt extruded in an extruder.

Sample D was prepared employing the polycarbonate powder of Sample C and was melt blended in an extruder under the same extruder conditions as employed with Sample B. The formulation was essentially the same as the formulation of Sample B except that about 1.0 weight % of water was added to the formulation based on the weight of the formulation. Downstream in the extruder the formulation was devolatilized under a vacuum of greater than about 20 inches of mercury through the vent in the extruder. The water bath employed for quenching the extruded polycarbonate strands was deionized water having a sulfate content of about 12 ppb and a chloride content of about 12 ppb.

Each formulation contained the same weight % of standard additives.

Each formulation was analyzed by Ion Chromatography (IC) analysis for sulfate and chloride ion content. The results obtained were as follows in TABLE 1 below. The test method consists of dissolving about 3–5 grams of the polycarbonate sample in 25 ml of methylene chloride. The ions are then extracted with 15 to 20 ml of deionized water. A 5 ml aliquot of extracted deionized water is injected on an Ion Chromatograph to determine total free 10 ions in the sample.

TABLE 1

| Sample | Total Free Sulfate Ion Content | Total Free Chloride Ion Content |
| --- | --- | --- |
| A | 565 | 1945 |
| B | 450 | 550 |
| C | 525 | 1555 |
| D | 276 | 156 |

EXAMPLE 2

This Example is set forth to show the amount of leachable sulfate and chloride ions that accumulate on the surface of the polycarbonate resin strands from plain city water as compared to deionized water after passing the strands of the polycarbonate resin through an aqueous quenching medium. The amount of leachable ions is primarily those ions on the surface of the polycarbonate strands picked up from the water bath. In this test procedure, 25 ml of deionized water was added to about 10 grams of a polycarbonate sample. The sample was then kept in an oven at 55° C. for about 16–20 hours. A 5 ml aliquot of extracted deionized water from the sample was then injected on an Ion Chromatograph to determine leachable-free ions on the surface of the polycarbonate as picked up from the quenching water bath.

Pellets from Sample D of Example 1 above were tested as described 5 above. Pellets from Sample E were also prepared in accordance with the same procedure used to prepare Sample D. However, in preparing Sample E, standard city water was used instead of deionized water. The results obtained were as follows:

TABLE 2

|  | Leachable Chloride Ions | Leachable Sulfate Ions |
| --- | --- | --- |
| Sample D Pellets | 10 | 20 |
| Sample E Pellets | 50 | 100 |

As can be seen from these Examples, the ionic impurities may be reduced by a process which comprises: employing water in the formulation during compounding, then devolatilizing the water which is probably in the form of water vapor or steam, and finally cooling the extruded strands in a water bath having a low ion concentration.

EXAMPLE 3

This Example is set forth to show that the process described herein can also drastically reduce the levels of free fluoride ion in polycarbonate/PTFE blends. A control and experimental sample polycarbonate/PTFE blends were prepared by blending 7% PTFE and 5% PTFE, respectively, into polycarbonate. The control sample was prepared by coextruding PTFE and polycarbonate without adding water to the extruder, and without quenching in a purified water bath. The samples were both prepared by extruding at about 525° F. In this experimental process, 1.0 weight % water was added to the formulation based on the weight of the polycarbonate. Downstream in the extruder, the formulation was devolatilized under a vacuum (>20 mm Hg) through the vent in the extruder. The water bath used for quenching was deionized water.

The extruded pellets of the control and experimental samples were then analyzed for fluoride content by the following procedure. A measured weight (approximately 50 g) of pellets was placed in each vial, and a measured amount of ultrapure (conductivity <0.2 ms/cm) water was added to the vial. The vials were then placed in an oven at 85° C. for 1 hour. The water in each vial was then analyzed for fluoride and chloride species using a Dianex HPLC set-up for ion-exchange chromatography. The detection limit for this equipment is less than 100 ppb for both fluoride and chloride species. The results (in ppb) are shown below in Table 3.

TABLE 3

|  | PTFE loading | fluoride | chloride |
| --- | --- | --- | --- |
| normal process | 3% | 1200 | 500 |
|  | 8% | 3000 | 500 |
| strip process | 3% | 110 | 50 |
|  | 8% | 400 | 50 |

As shown in Table 3, the process according to the invention produces Polycarbonate/PTFE blending having very low amounts of fluoride and chloride contamination.

Although the invention has been described by references to particular illustrative embodiments thereof, many variations and modifications of the invention may become apparent to those skilled in the art without departing from the spirit and scope of this invention as set forth in the claims appended hereto.

What is claimed is:

1. An article formed from an aromatic polycarbonate/polytetrafluoroethylene composition comprising polycarbonate and 1 to 15 percent polytetrafluoroethylene based on total weight of polycarbonate, wherein said composition comprises 400 parts per billion or less leachable fluoride ions whereby such formed article is noncorrosive.

2. The article according to claim 1, wherein said composition comprises 110 parts per billion or less leachable fluoride ions.

3. A process for preparing a noncorrosive article formed from a polycarbonate/polytetrafluoroethylene composition having reduced ionic impurities, said process comprising (i) melt blending a polycarbonate resin with from 1 to 15 percent polytetrafluoroethylene based on the total weight of polycarbonate, together with sufficient aqueous medium to reduce the concentration of ionic impurities to 400 parts per billion or less, (ii) devolatilizing the water comprising ionic impurities away from the composition, (iii) extruding the polycarbonate composition into an aqueous medium quenching bath, wherein said aqueous medium is deionized, pelletizing the composition, (iv) heating the composition above its melting point and (v) forming the article.

4. The process of claim 3, wherein the devolatilization is performed under a vacuum.

5. The process of claim 3, wherein the amount of aqueous medium added is about 0.25 to about 2.0 weight % based on the weight of the polycarbonate/polytetrafluoroethylene composition.

6. The process of claim 5, wherein the aqueous medium added is about 0.75 to about 1.5 weight %.

7. The process of claim 3, wherein the aqueous medium is water.

8. The process of claim 7, wherein the water is deionized.

9. The article of claim 1 which is formed by injection molding.

10. The article of claim 9 which is a computer hard drive platter carrier.

11. The article of claim 9 which is a silicon pre-chip wafer carrier.

12. The article of claim 9 which is a part for a computer hard drive.

13. The article of claim 1 which is formed by profile extrusion.

14. The article of claim 1 which is formed by coextrusion.

15. The article of claim 1 which is hollow and formed by extrusion blow molding.

16. The article of claim 1 which is formed by sheet or film extrusion.

* * * * *